US012627213B2

(12) United States Patent
Yoon et al.

(10) Patent No.: US 12,627,213 B2
(45) Date of Patent: May 12, 2026

(54) SWITCHING-LOSS BALANCING CIRCUIT FOR POWER CONVERSION DEVICE

(71) Applicant: LG INNOTEK CO., LTD., Seoul (KR)

(72) Inventors: Dong Keun Yoon, Seoul (KR); Sung Jae Kong, Seoul (KR); Sang Gyu Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 194 days.

(21) Appl. No.: 18/575,092

(22) PCT Filed: Jul. 4, 2022

(86) PCT No.: PCT/KR2022/009626
§ 371 (c)(1),
(2) Date: Dec. 28, 2023

(87) PCT Pub. No.: WO2023/277673
PCT Pub. Date: Jan. 5, 2023

(65) Prior Publication Data
US 2024/0429807 A1 Dec. 26, 2024

(30) Foreign Application Priority Data
Jul. 2, 2021 (KR) ........................ 10-2021-0087296

(51) Int. Cl.
*H02M 7/797* (2006.01)
*H02M 1/00* (2007.01)

(52) U.S. Cl.
CPC ......... *H02M 1/0054* (2021.05); *H02M 7/797* (2013.01)

(58) Field of Classification Search
CPC ........ H02M 3/073; H02M 3/10; H02M 3/135; H02M 3/137; H02M 3/28; H02M 3/315;
(Continued)

(56) References Cited

U.S. PATENT DOCUMENTS 4,278,930 A * 7/1981 Rogers ................... G01R 17/10
                                                        323/277
2013/0039107 A1* 2/2013 Fukuta .................... H02M 7/48
                                                        363/131
(Continued)

FOREIGN PATENT DOCUMENTS

JP       2007-151225      6/2007
JP       2015-050818      3/2015
KR    10-2019-0074589     6/2019

OTHER PUBLICATIONS

International Search Report dated Oct. 20, 2022 issued in Application No. PCT/KR2022/009626.
(Continued)

*Primary Examiner* — Crystal L Hammond
*Assistant Examiner* — Nusrat Quddus
(74) *Attorney, Agent, or Firm* — KED & ASSOCIATES, LLP

(57) ABSTRACT
A balancing circuit according to an embodiment of the present invention comprises: a second resistor connected to the same node as that of a first resistor of a voltage sensing unit connected to a first terminal of an output end of a power conversion device; and a fourth resistor connected to the same node as that of a third resistor of the voltage sensing unit connected to a second terminal of the output end of the power conversion device, wherein the second resistor and the fourth resistor are connected to an upper switch of the power conversion device.

14 Claims, 6 Drawing Sheets

(58) Field of Classification Search
CPC .... H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/1582; H02M 3/1584; H02M 3/285; H02M 3/33561; H02M 7/49; H02M 1/045; H02M 7/006; H02M 7/06; H02M 7/068; H02M 7/153; H02M 1/088; H02M 7/103; H02M 7/106; H02M 7/19; H02M 7/08; H02M 7/17; H02M 2001/007; H02M 7/493; H02M 7/5381; H02M 7/483; H02M 7/53873; H02M 1/084; H02M 1/0845; H02H 7/261; H02H 7/268; H02J 3/36; H02J 3/01; H02J 3/46; H02J 3/38; H02J 13/00002; G01R 31/3277; H02S 50/10; H02S 40/32
See application file for complete search history.

(56) References Cited

U.S. PATENT DOCUMENTS

| | | | | |
|---|---|---|---|---|
| 2013/0134958 | A1* | 5/2013 | Mochikawa | H03K 17/687 |
| | | | | 307/112 |
| 2014/0126262 | A1* | 5/2014 | Lu | H02M 7/42 |
| | | | | 363/131 |
| 2015/0222117 | A1* | 8/2015 | Im | H02J 1/06 |
| | | | | 307/52 |
| 2016/0105130 | A1* | 4/2016 | Furuchi | H02P 6/085 |
| | | | | 363/132 |
| 2020/0036297 | A1* | 1/2020 | Yamahira | H02M 1/088 |
| 2021/0184592 | A1* | 6/2021 | Sterna | H02M 1/38 |
| 2021/0194384 | A1 | 6/2021 | Nene et al. | |
| 2021/0408943 | A1* | 12/2021 | Maki | H02M 1/088 |
| 2024/0088778 | A1* | 3/2024 | Tawaragi | H02M 1/08 |

OTHER PUBLICATIONS

Frisch, Michael et al. New 3-Level Topology for Efficient Solar Applications. In: Power Electronics Europe. 2014, Issue 7, pp. 29-31.

* cited by examiner

【FIG. 1】
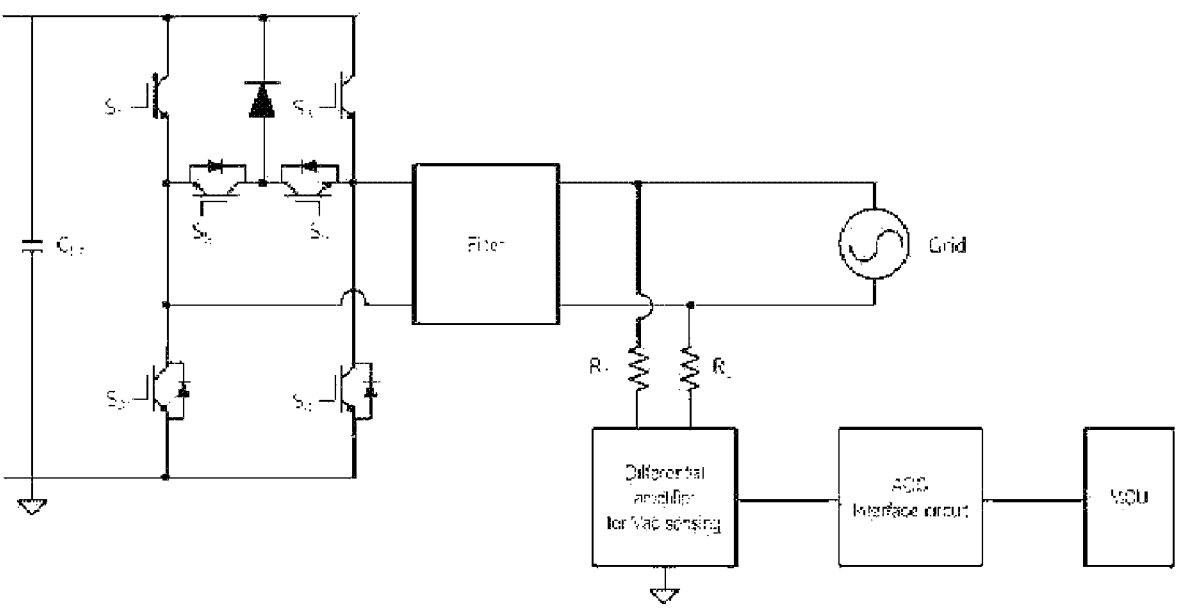

【FIG. 2】
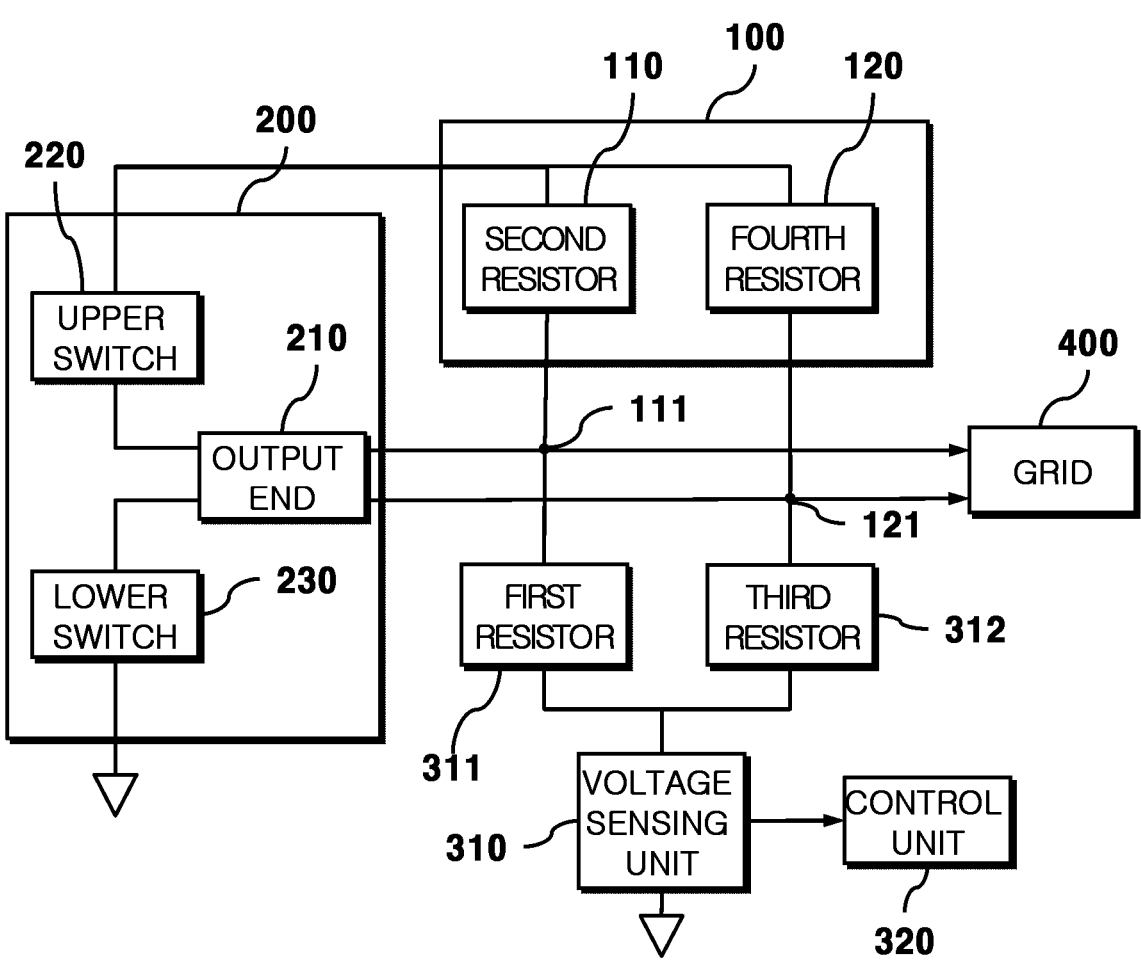

【FIG. 3】
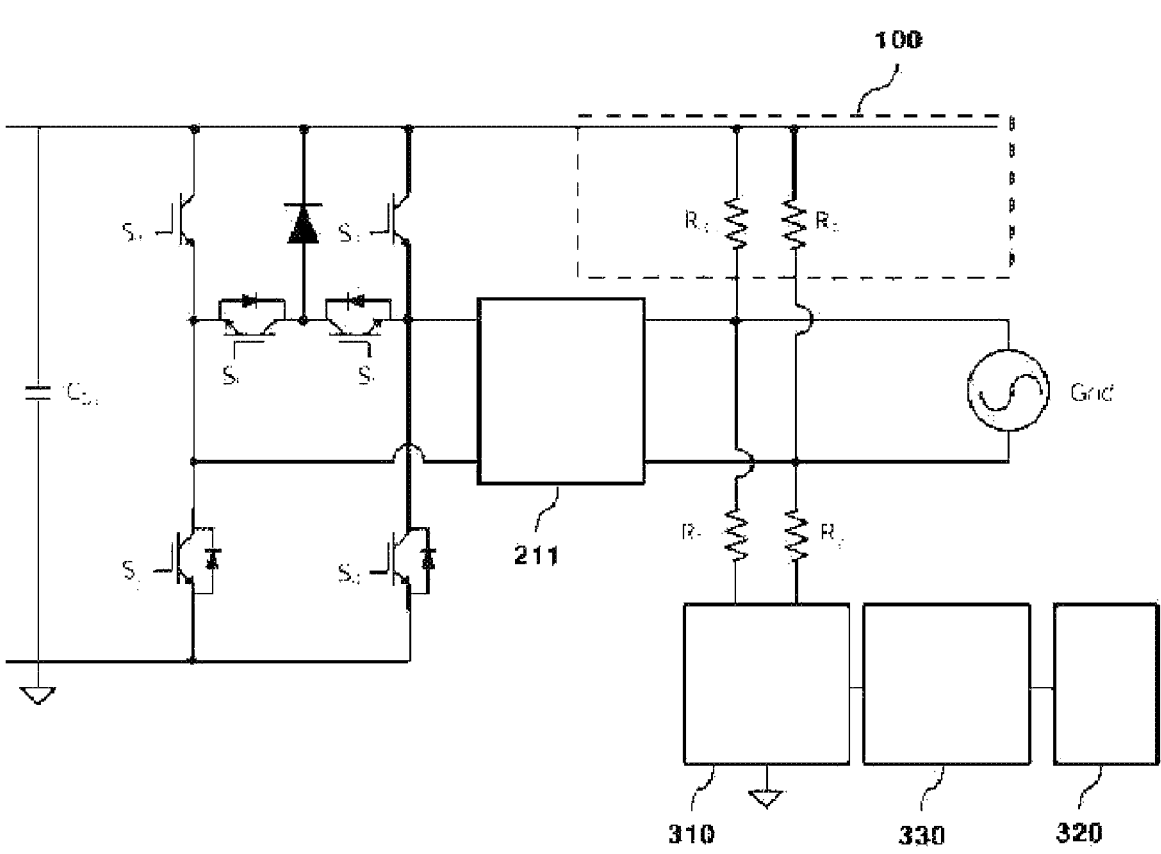

【FIG. 4】

| OUTPUT POWER | 7.6KW | MAX OUTPUT CONDITION |
|---|---|---|
| GRID FREQUENCY | 63Hz | MAX FREQUENCY CONDITION |
| GRID VOLTAGE | 264Vrms | MAX VOLTAGE CONDITION |
| VDC-link | 550V | AVERAGE VALUE |

(A)

| | POWER LOSS |
|---|---|
| TOTAL | 89.8W |
| FIRST AND SECOND UPPER SWITCH | 20.23 + 21.96 = 42.19W |
| FIRST AND SECOND LOWER SWITCH | 10.07 + 9.31 = 19.38W |
| FIRST AND SECOND SWITCH | 14.13 + 14.1 = 28.23W |

| | POWER LOSS |
|---|---|
| TOTAL | 89.7W |
| FIRST AND SECOND UPPER SWITCH | 14.54 + 15.77 = 30.31W |
| FIRST AND SECOND LOWER SWITCH | 16.21 + 15.01 = 31.22W |
| FIRST AND SECOND SWITCH | 14.1 + 14.07 = 28.17W |

【FIG. 6】
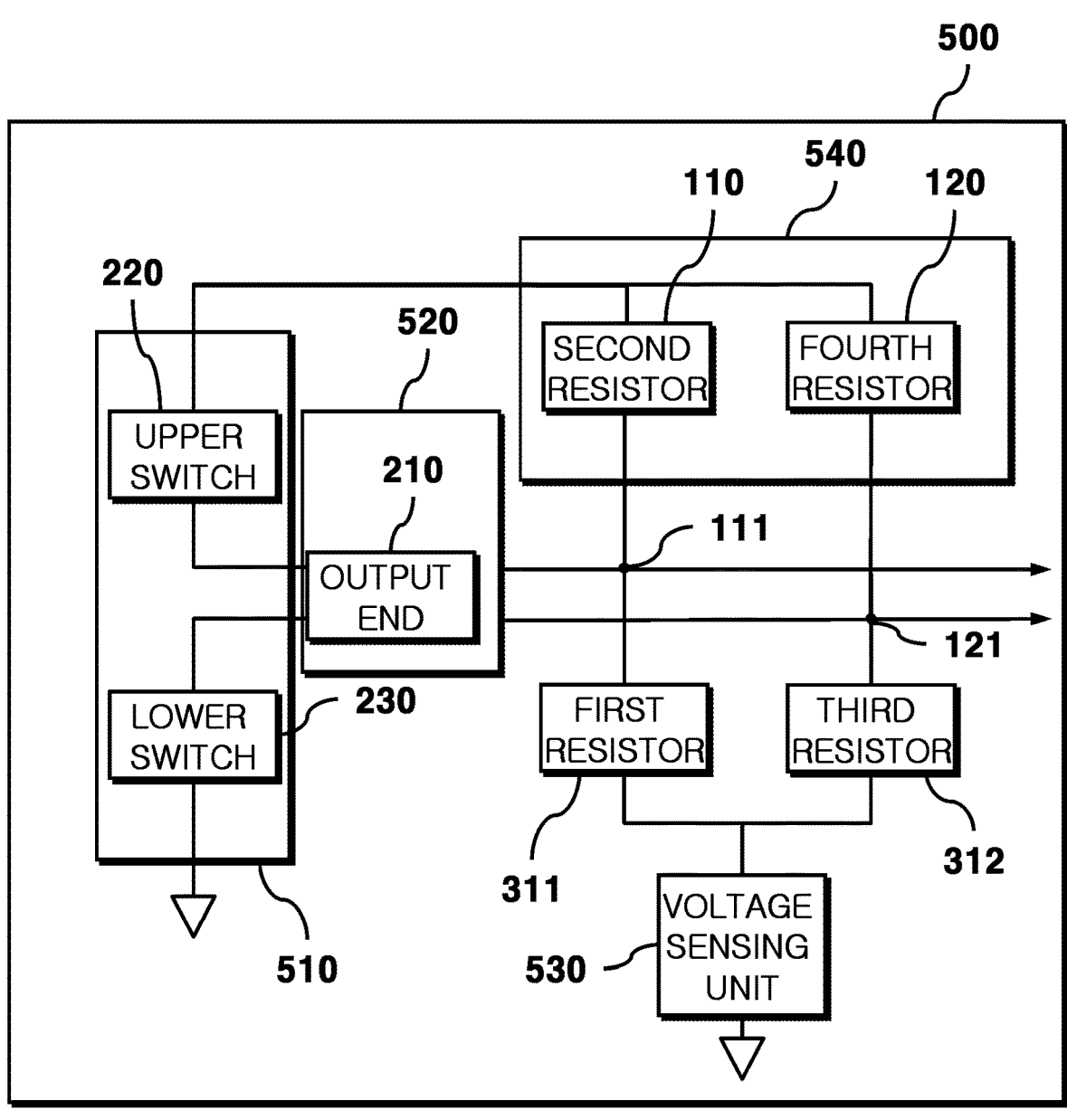

SWITCHING-LOSS BALANCING CIRCUIT FOR POWER CONVERSION DEVICE

CROSS-REFERENCE TO RELATED PATENT APPLICATIONS

This application is a U.S. National Stage Application under 35 U.S.C. § 371 of PCT Application No. PCT/KR2022/009626, filed Jul. 4, 2022, which claims priority to Korean Patent Application No. 10-2021-0087296, filed Jul. 2, 2021, whose entire disclosures are hereby incorporated by reference.

TECHNICAL FIELD

The teachings in accordance with exemplary and non-limiting embodiments of this invention relate generally to a balancing circuit and a power conversion device, and more particularly to a balancing circuit that balances a switching loss of a multilevel inverter and a power conversion device.

BACKGROUND ART

Photovoltaic power generation is an eco-friendly energy generation method that has been widely used to replace conventional chemical and nuclear power generation. Photovoltaic power generation includes a stand-alone power generation connected to a converter by a battery and a connected type connected to a grid system, and in general, the stand-alone generation consists of solar cells, storage batteries, and power conversion devices, while grid-connected systems are connected to commercial power sources so that power can be exchanged with the load grid.

The power generated by solar photovoltaics (PV) is transmitted to the power system, the grid, through an inverter. As shown in FIG. 1, the inverter converts the power to match the voltage of the power outputted from the solar panel with the voltage of the grid, and it is transmitted to the grid through a filter. At this time, when the inverter is in free-wheeling switching mode, the (−) node of the DC-LINK is floating relative to the grid power, so the difference in impedance between the upper and lower sides determines the VDS voltage of each switch (S1, S2, S3, S4).

As the lower impedance is reduced by the differential amplifier added for sensing the AC voltage at the output end, the VDS voltage of the switches (S1, S3) becomes DC-LINK voltage, and because the VDS voltage of the switches (S2, S4) is reduced to 0V level, the switching loss is concentrated on S1 and S3 due to the large VDS voltage of S1 and S3, and the upper switches generate more heat, so there is a problem that the use temperature condition is limited under the same switching loss condition.

DETAILED DESCRIPTION OF INVENTION

Technical Subject

The technical problem that the present invention seeks to solve is to provide a balancing circuit that balances the switching losses of a multilevel inverter and a power conversion device.

Technical Solution

In one general aspect of the present invention, there may be provided a balancing circuit, comprising:

a second resistor connected to the same node as that of a first resistor of a voltage sensing unit connected to a first terminal of an output end of a power conversion device; and a fourth resistor connected to the same node as that of a third resistor of the voltage sensing unit connected to a second terminal of the output end of the power conversion device, wherein the second resistor and the fourth resistor are connected to an upper switch of the power conversion device.

Preferably, but not necessarily, the power conversion device may include a plurality of upper switches and a plurality of lower switches.

Preferably, but not necessarily, the power conversion device may be an inverter that operates at a multilevel based on the operation of the plurality of upper switches and the plurality of lower switches.

Preferably, but not necessarily, said power conversion device may include: a first upper switch and a first lower switch connected in series with said first upper switch; a second upper switch and a second lower switch connected in series with said second upper switch; a first switch and a second switch connected in series between a first node between said first upper switch and said second lower switch and a second node between said second upper switch and said second lower switch; and a diode connected between a first node connecting said first upper switch and said second upper switch and a third node between said first switch and said second switch.

Preferably, but not necessarily, the node to which said second resistor is connected may be a (+) terminal of said power conversion device, and the node to which said fourth resistor is connected may be a (−) terminal of said power conversion device.

Preferably, but not necessarily, said voltage sensing unit may be connected to the same ground as said power conversion device.

In another general aspect of the present invention, there may be provided a power conversion device, comprising: a switching unit including an upper switch and a lower switch; an output unit that outputs a multi-level voltage according to the operation of the switching unit; a voltage sensing unit that senses the output voltage by connecting both ends of the output part through a first resistor and a third resistor, respectively; and a balancing unit including a second resistor and a fourth resistor symmetrically connected to the first resistor and the third resistor, wherein the second resistor and the fourth resistor are connected to a plurality of upper switches.

Preferably, but not necessarily, said switching unit may include a first upper switch and a first lower switch connected in series with said first upper switch; a second upper switch and a second lower switch connected in series with said second upper switch; a first switch and a second switch connected in series between a first node between said first upper switch and said second lower switch and a second node between said second upper switch and said second lower switch; and a diode connected between a first node connecting said first upper switch and said second upper switch and a third node between said first switch and said second switch.

Preferably, but not necessarily, said second resistor may be connected to a (+) terminal of said output unit, and said fourth resistor may be connected to a (−) terminal of said output unit.

Preferably, but not necessarily, said voltage sensing unit may be connected to the same ground as said lower switch.

Advantageous Effect

According to exemplary embodiments of the present invention, in a multilevel inverter, the impedance of the high-side and low-side can be balanced by adding a simple passive element. Since the impedance of the high-side and low-side are equal, the VDS of the switches is the same voltage, so the switching losses between the high-side and low-side switches are equalized to the same level and the phenomenon of heating of the switches being concentrated to one side can be improved. This allows it to be used in higher temperature conditions.

BRIEF DESCRIPTION OF DRAWINGS

FIG. 1 is an illustration of an inverter according to a comparative exemplary embodiment of the present invention.

FIG. 2 is a block diagram of a balancing circuit according to one exemplary embodiment of the present invention.

FIGS. 3 to 5 are drawings to illustrate a balancing circuit according to an exemplary embodiment of the present invention.

FIG. 6 is a block diagram of a power conversion device according to an exemplary embodiment of the present invention.

BEST MODE

Hereinafter, exemplary embodiments of the present invention will be described in detail with reference to the accompanying drawings.

However, the present invention is not limited to the given exemplary embodiments described, but may be implemented in a variety of different forms, and one or more of components among the exemplary embodiments may be optionally combined or substituted between embodiments within the scope of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention. In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

FIG. 2 is a block diagram of a balancing circuit according to one embodiment of the present invention.

The balancing circuit (100) according to an exemplary embodiment of the present invention may comprise a second resistor (110) and a fourth resistor (120).

The second resistor (110) may be connected to the same node (111) as a first resistor (311) of a voltage sensing unit (310) connected to a first terminal of an output end (210) of a power conversion device (200), and the fourth resistor (120) may be connected to a same node (121) as a third resistor (312) of the voltage sensing unit (310) connected to a second terminal of the output end (210) of the power conversion device (200). Said second resistor (110) and said fourth resistor (120) may be connected to an upper switch (220) of said power conversion device (200).

The power conversion device (200) may include an upper switch (220) and a lower switch (230) to convert an applied power and output it to an output end (210). The output end (210) may be connected to a grid (400), and the power conversion device (200) may convert the power to correspond to the voltage of the grid (400) to provide power to the grid (400). As used herein, the grid (400) refers to an electric power network, represented by the acronym GRID. A power receiving device, i.e., a load, may be connected to the output end (210) to receive power, and the power conversion device (200) may convert and output the power to provide power to the load. The output end (210) may provide a stable power to the grid (400) through a filter.

The power conversion device (200) may be a DC-DC converter or an inverter for converting power. Since the grid (400) needs to be provided with alternating current power, the power conversion device (200) may be an inverter. As used herein, an inverter is a device that converts DC power to AC power, which may also be referred to as a DC-AC converter. The power conversion device (200) may be a power conversion device used in a solar power system. It may be an inverter that converts power generated by solar panels, or power outputted from a battery that stores power generated by solar panels, into power suitable for the grid (400). The power conversion device (200) may be a bidirectional inverter that provides power to the grid (400) or draws power from the grid (400) to charge the battery during times when solar power generation is difficult or when external power is cheap.

The power conversion device (200) may include a plurality of upper switches and a plurality of lower switches to convert power, and may convert power based on the operation of the plurality of upper switches and the plurality of lower switches. In this case, the power conversion device (200) may operate as a single-phase multilevel. The power conversion device (200) may operate as a first level, a second level, and a third level depending on the operation of the upper switch and the lower switch. Alternatively, The power conversion device may operate as a first level and a second level, or it may operate as four or more levels. The first level, second level, and third level may be +VDC, 0V, and −VDC, respectively.

When the power conversion device (200) operates at the first level, second level, and third level, switching operations of the switches are performed when switching from the current level to the other levels, where switching losses may occur. Switching loss refers to a power loss that occurs when the current flowing through the switch is not immediately cut off when the switch is switched from an ON state to an OFF state.

The power conversion device (200) may include a control unit that controls the power conversion device (200) by sensing voltages or currents at the input end and the output end. Here, the control unit may be an MCU, and may perform maximum power point tracking control to increase the efficiency of the solar power generation. Maximum power point tracking (MPPT) can be used to increase the efficiency of solar power generation. Depending on the characteristics of the relationship between current and voltage and the relationship between voltage and power in solar power generation, the maximum power may be the power at about 80% of the maximum voltage rather than the maximum voltage. Since the maximum power point keeps changing depending on the magnitude of the current generated by the solar panel, it is necessary to keep looking for the point where the maximum power point can be generated. In other words, in order to track the maximum power rather than the maximum voltage, the magnitude of the voltage and current can be varied so that the maximum power is achieved. That is, the voltage can be decreased and the current increased in the direction of increasing power, or the voltage can be increased and the current can be decreased.

The power conversion device (200) may further include a sensing unit for sensing a voltage or current at an input end or an output end (210) for use in controlling the control unit (320). A voltage sensing unit (310) may be connected to the output end (210) to sense the voltage of the output end (210). In this case, the voltage sensing unit (310) connected to the output end (210) may sense the voltage between the two ends of the output end (210) by connecting the first resistor (311) and the third resistor (312) to the output end (210) for voltage sensing. At this time, since the voltage sensing unit is connected to the same ground as the power conversion unit, an impedance difference according to the first resistor (311) and the third resistor (312) may occur between the upper side where the upper switch is located and the lower side where the lower switch is located of the power conversion device (200).

The power conversion device (200) may include a first upper switch and a first lower switch in series with said first upper switch, a second upper switch and a second lower switch in series with said second upper switch, a diode connected in series between a first node between said first upper switch and said second lower switch and a second node between said second upper switch and said second lower switch, and a diode connected between a first node connecting between said first upper switch and said second upper switch and a third node between said first switch and said second switch.

The power conversion device may include six switches including a first upper switch S1, a first lower switch S2, a second upper switch S3, a second lower switch S4, a first switch S5, and a second switch S6, and a diode, as shown in FIG. 3. A filter (211) may be connected to the output end, which may provide stable power to the grid through the filter (211). The power conversion device (200) may operate in three levels depending on the operation of the six switches. Here, each switch may be a semiconductor switching element such as a FET, IGBT, or other type of switching element. S1 and S2, S3 and S4, which are connected in series and form a pair, may conduct complementarily to each other.

First, if S3 and S2 are ON and S1, S4, S5, and S6 are OFF, a path is formed from S3→Output (+) Terminal→Grid-→Output (−) Terminal→S2, and +VDC, the voltage across the DC link, C_DC, is outputted at the output end. If S1 and S4 are ON and S2, S3, S5, and S6 are OFF, the path S1→Output (−) terminal→Grid→Output (+) terminal→S4 is formed, and −VDC is outputted as the inverse of the voltage applied to the DC link, C_DC.

When S5 and S6 are ON and S1, S2, S3, S4 are OFF, a path is formed from S5→S6→output (+) terminal→grid-→output (−) terminal→back to S5, so the voltage applied to the DC link, C_DC, is not transmitted to the output terminal, and this mode is called freewheeling switching mode. Since the (−) node of the DC-LINK is floating with respect to the GRID power, the difference in impedance between the upper and lower sides determines the VDS voltage of each switch (S1, S2, S3, S4). As described above, in order to sense the voltage of the output end, the voltage sensing unit (310) connects R1 and R2 to the two ends of the output end, i.e., the (+) terminal and the (−) terminal of the output end, respectively, to sense the voltage of the output end. The voltage sensing unit (310) may include a differential amplifier. The voltage sensing unit (310) may sense the AC voltage, which is the voltage at the output end, and pass it through the ADC (ANALOG TO DIGITAL CONVERTER, 330) to the MCU, which is the control unit (320). The control unit (320) can control S1 to S6 using the sensed output end voltage.

The voltage sensing unit (310) and the power conversion device (200) are connected to the ground with the same potential, and R1 and R2 and the lower switch are connected in parallel, so that the impedance on the lower side is reduced by R1 and R2. Therefore, the VDS voltage, which is the drain-source voltage of the upper switches S1 and S3 formed by IGBTs, becomes a DC-LINK voltage, and the VDS voltage of the lower switches S2 and S4 formed by IGBTs is reduced to 0V. Since the VDS voltage of S1 and S3 becomes significantly larger than the VDS voltage of S2 and S4, the switching losses are concentrated on the upper switches S1 and S3. This causes the upper switches to generate more heat, which limits the operating temperature conditions under the same switching loss condition.

However, balancing can be achieved by connecting the second resistor (110), R3 which is the fourth resistor, and R4, in response to connecting the second resistor (110) of R3 to the first resistor (311) of R1 and the same node, and connecting the fourth resistor (120) of R4 to the third resistor (312) of R2 and the same node, and connecting the first resistor (311) of R1 and third resistor (312) of R2 to a lower side with a ground common. Here, the difference between the value of the first resistor (311) and the value of the second resistor (110) is set within a preset range, and the difference between the value of the third resistor (312) and the value of the fourth resistor (120) is also set within a preset range to enhance the balancing effect. Further, the value of the first resistor (311) and the value of the second resistor (110) can be set equal, and the value of the third resistor (312) and the value of the fourth resistor (120) can be set equal.

Since the impedances on the upper and lower sides become the same value, the VDS of the switches (S1, S2, S3, S4) becomes the same voltage. Therefore, the switching losses between the upper and lower switches are matched to the same level.

Under the conditions of FIG. 4(A), when the balancing circuit (100) according to an embodiment of the present invention is not applied, the power loss is as shown in FIG.

4(B). Under the condition that the output power is 7.6 KW at the maximum output condition, the grid frequency is 63 HZ at the maximum frequency condition, the grid voltage is 264 VRMS at the maximum voltage condition, and the VDC-LINK voltage is 550V at the average value, it can be seen that the power loss generated by the first and second upper switches is 42.19 W, and the power loss generated by the first and second lower switches is 19.38 W, which is more than twice the difference.

On the other hand, when the balancing circuit (100) according to an embodiment of the present invention is applied, it can be seen that under the same conditions of FIG. 4(A), the power loss generated by the first and second upper switches is 30.31 W, and the power loss generated by the first and second lower switches is 31.22 W, which are balanced with each other, as shown in FIG. 5. In other words, by connecting passive elements corresponding to the first resistor (311) and the second resistor (110), it is possible to balance the switching loss of the power conversion device (200). As a result, the heat generated by the switching loss is not concentrated on the upper switch, but is distributed to the upper and lower switches, thereby improving the heat imbalance of the switch. The balancing circuit (100) according to an embodiment of the present invention can be used under higher temperature conditions than without.

FIG. 6 is a block diagram of a power conversion device according to an exemplary embodiment of the present invention.

A power conversion device (500) according to an exemplary embodiment of the present invention may comprise a switching unit (510), an output unit (520), a voltage sensing unit (530), and a balancing unit (540). The detailed description of each configuration in FIG. 6 corresponds to the detailed description of the balancing circuit in FIGS. 2 to 5, and redundant descriptions will be omitted hereinafter.

The switching portion (510) may include an upper switch (220) and a lower switch (230).

The switching unit (510) may include a first upper switch and a first lower switch connected in series with said first upper switch, a second upper switch and a second lower switch connected in series with said second upper switch, a first switch and a second switch connected in series between a first node between the first upper switch and the second lower switch and a second node between the second upper switch and the second lower switch, and a diode connected between a first node between the first upper switch and the second upper switch and a third node between the first switch and the second switch.

The output unit (520) may output a multi-level voltage according to the operation of the switching unit (510), and the voltage sensing unit (530) may be connected to both terminals of the output unit (520) through the first resistor (311) and the third resistor (312), respectively, to sense the output voltage. The second resistor (110) may be connected to the (+) terminal of the output unit (520), and the fourth resistor (120) may be connected to the (−) terminal of the output unit (520). The voltage sensing unit (530) may be connected to the same ground as the lower switch (510). The balancing unit (540) may include a second resistor (110) and a fourth resistor (120) symmetrically connected to the first resistor (311) and the third resistor (312), and the second resistor (110) and the fourth resistor (120) may be connected to a plurality of upper switches (220).

One of ordinary skill in the art to which this invention relates will understand that variations may be implemented without departing from the essential features of the above-described subject matter. The disclosed methods are therefore to be considered from an illustrative rather than a limiting point of view. The scope of the invention is shown in the patent claims and not in the foregoing description, and all differences within the scope of the claims are to be construed as included in the invention.

The invention claimed is:

1. A balancing circuit, comprising:
   a second resistor, one end of which is connected to a same node as that of a first resistor of a voltage sensing unit; and
   a fourth resistor, one end of which is connected to a same node as that of a third resistor of the voltage sensing unit,
   wherein the first resistor is connected to a first terminal of an output end of a power conversion device,
   wherein the third resistor is connected to a second terminal of the output end of the power conversion device,
   wherein the power conversion device comprises:
      a first upper switch and a first lower switch connected in series with one end of the first upper switch;
      a second upper switch and a second lower switch connected in series with one end of the second upper switch;
      a first switch and a second switch connected in series between a first node between the first upper switch and the second lower switch, and a second node between said second upper switch and the second lower switch; and
      a diode connected between a third node connecting the other end of the first upper switch and the other end of the second upper switch, and a fourth node between the first switch and the second switch,
   wherein the first terminal of the output end of the power conversion device is a terminal connected to the second node,
   wherein the second terminal of the output end of the power conversion device is a terminal connected to the first node,
   wherein the other end of the second resistor and the other end of the fourth resistor are connected to the third node of the power conversion device, and
   wherein the voltage sensing unit is connected to a same ground as the power conversion device.

2. The balancing circuit of claim 1, wherein a difference between a sum of switching losses of the first upper switch and the second upper switch and a sum of switching losses of the first lower switch and the second lower switch is within a preset range.

3. The balancing circuit of claim 1, wherein the power conversion device is an inverter configured to operate at a multi-level according to operation of the first upper switch, the second upper switch, the first lower switch and the second lower switch.

4. The balancing circuit of claim 3, wherein the power conversion device operates at one of a first level, a second level, and a third level.

5. The balancing circuit of claim 3, wherein the first level, the second level, and the third level are +Vdc, 0V, and −Vdc respectively.

6. The balancing circuit of claim 1, wherein a difference between a value of the first resistor and a value of the second resistor is set within a preset range, and
   wherein a difference between a value of the third resistor and a value of the fourth resistor is set within a preset range.

7. The balancing circuit of claim 1, wherein a value of the first resistor is same as a value of the second resistor, and wherein a value of the third resistor is same as a value of the fourth resistor.

8. The balancing circuit of claim 1, wherein the power conversion device is bidirectional inverter which supplies power to grid through a filter or receives power from grid.

9. A power conversion device, comprising:

a switching unit comprising an upper switch and a lower switch;

an output unit configured to output a multi-level voltage according to operation of the switching unit;

a voltage sensing unit configured to sense output voltage by connecting a first terminal and a second terminal of the output unit through a first resistor and a third resistor respectively;

a second resistor, one end of which is connected to one end of the first resistor; and a fourth resistor, one end of which is connected to one end of the third resistor, wherein the switching unit comprises:

a first upper switch and a first lower switch connected in series with the first upper switch;

a second upper switch and a second lower switch connected in series with the second upper switch;

a first switch and a second switch connected in series between a first node between the first upper switch and the second lower switch, and a second node between the second upper switch and the second lower switch; and a diode connected between a third node connecting the other end of the first upper switch and the other end of the second upper switch, and a fourth node between the first switch and the second switch, wherein the first terminal of the output end of the power conversion device is a terminal connected to the second node, wherein the second terminal of the output end of the power conversion device is a terminal connected to the first node, wherein the other end of the second resistor and the other end of the fourth resistor are connected to the third node of the power conversion device, and wherein the voltage sensing unit is connected to a same ground as the lower switch.

10. The power conversion device of claim 9, wherein the power conversion device operates at one of a first level, a second level, and a third level.

11. The power conversion device of claim 10, wherein the first level, the second level, and the third level are +Vdc, 0V, and −Vdc respectively.

12. The power conversion device of claim 9, wherein a difference between a value of the first resistor and a value of the second resistor is set within a preset range, and wherein a difference between a value of the third resistor and a value of the fourth resistor is set within a preset range.

13. The power conversion device of claim 9, wherein a value of the first resistor is same as a value of the second resistor, and wherein a value of the third resistor is same as a value of the fourth resistor.

14. The power conversion device of claim 9, wherein the power conversion device is bidirectional inverter which supplies power to grid through a filter or receives power from grid.

* * * * *